Nov. 3, 1931.  F. W. SPERR, JR  1,830,178

REMOVAL OF NAPHTHALENE AND TAR FROM FUEL GAS

Filed July 9, 1926    4 Sheets-Sheet 1

INVENTOR
Frederick W. Sperr, Jr.
BY
HIS ATTORNEYS

Nov. 3, 1931.　　　F. W. SPERR, JR　　　1,830,178
REMOVAL OF NAPHTHALENE AND TAR FROM FUEL GAS
Filed July 9, 1926　　　4 Sheets-Sheet 3

INVENTOR
Frederick W. Sperr Jr.
BY
Byrnes, Stebbins & French
HIS ATTORNEYS

Nov. 3, 1931.   F. W. SPERR, JR   1,830,178
REMOVAL OF NAPHTHALENE AND TAR FROM FUEL GAS
Filed July 9, 1926   4 Sheets-Sheet 4

INVENTOR
Frederick W. Sperr, Jr.
BY
Byrnes, Stebbins & Parmelee
HIS ATTORNEYS Patented Nov. 3, 1931

1,830,178

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

REMOVAL OF NAPHTHALENE AND TAR FROM FUEL GAS

Application filed July 9, 1926. Serial No. 121,357.

This invention relates broadly to the removal of naphthalene and tar from fuel gas, particularly from flowing fuel gas during the manufacture and treatment thereof. The invention is herein described as applied to the treatment of by-product coke oven gas.

In the treatment of by-product coke oven gas, a well defined procedure has been generally followed in preparing the gas for use. This procedure includes collection of the gas, cooling the same by indirect contact with water in the so-called primary cooler, passing the cool gas through the well known Pelouize and Audouin extractor for the removal of tar, reheating the gas and passing it through a bath of sulphuric acid to form ammonium sulphate, removing the ammonium sulphate and then cooling the gas in the so called final cooler. In order to cause flow of the gas through all of the apparatus employed, it is necessary to provide a gas pump or exhauster in the flow line and this exhauster is generally placed after the tar extractor. The back pressure of the tar extractor is high, and a considerable differential in pressure conditions between the coke oven and the exhauster is inevitable although it is undesirable.

When the gas is to be used for domestic purposes, the light oils present in the gas are generally not removed.

In the system briefly outlined above, no provision has been made for the removal of naphthalene which may be present in amounts up to 60 grains per hundred cubic feet of gas or more. The presence of naphthalene in the gas, even in very small amounts, has proved very troublesome especially when the gas is sent into mains for distribution. The naphthalene forms deposits which cause serious stoppages in the mains and with the advent of the so called "dry" gas naphthalene problems have become more acute than ever.

In my prior Patent Number 1,578,687 of March 30th, 1926, I have described and claimed a method whereby naphthalene may be substantially completely removed from fuel gas by the use of a suitable solvent. This patent illustrates a treating tower in which the flowing fuel gas is brought into intimate contact with the solvent by the use of distributive and contact means. The contact means employed preferably consist of banks of spiral metal turnings. These metal turnings are also described and claimed in my pending application Serial No. 84,640 filed January 29, 1926, as a division of the application eventuating in my patent aforesaid.

I have found that highly improved results may be attained by forming the contact means of a non-corrodible metal such as aluminum preferably in the form of spiral turnings. These are easily obtained in a form especially suitable for securing contact between a gas and a liquid and they offer excellent contact means providing a large surface, low resistance to the flow of gas and liquid and extreme lightness.

An important advantage of a non-corrodible contact means, such as aluminum turnings over steel turnings, is the fact that corrosion of the banks of contact material is avoided. In the treating tower disclosed in my Patent Number 1,578,687, the gas is supplied substantially free of ammonia and hydrogen sulphide in order to avoid this corrosion. In one instance it was found necessary to pass the gas through the final cooler, then through iron oxide boxes for the removal of $H_2S$ and then by reason of the heat introduced in the latter, it was necessary to pass the gas through another cooler prior to the naphthalene removal. By the use of the aluminum turnings it is possible to remove naphthalene and tar from the gas prior to the removal of ammonia, hydrogen sulphide and other corrosive materials present in coal gas and I preferably accomplish this immediately subsequent to the primary cooler or the exhauster. This arrangement does away with the necessity for any other tar extraction apparatus and the pressure differential between the ovens and the exhauster is greatly decreased, thus facilitating the regulation of flow through the gas line by suitable control of the exhauster.

By my invention, it is possible to remove tar and/or naphthalene in the presence of corrosive substances. The corrosion which formerly occurred resulted in stoppages, unequal distribution of gas over the treating tower, frequent replacements of parts and the like. Also, the sulphidation of the steel turnings was a dangerous hazard. In the presence of inflammable substances such as gas and oil, combustion of the layer of sulphide on the turnings was apt to occur even if only limited quantities of air or oxygen were present. Air might be introduced, for example, during a period of inactivity or through leakage. All of this is avoided by my invention.

A further disadvantage in the use of steel turnings lies in the fact that the dissolved iron resulting from the corrosive action of $H_2S, NH_3, HCN$, and moisture in the gas, tends to exert a catalytic action, favoring polymerization and thickening of the tar oil used for scrubbing. This is avoided by my present invention.

I provide for the removal of tar substantially simultaneously with that portion of the naphthalene which is removed by the recirculating step in my prior patent above referred to. The removal of tar and naphthalene is accomplished by a solvent which is recirculated in the path of the gas and I make use of a solvent in which both tar and naphthalene are soluble. Such a solvent may comprise a distillate of coal tar or water gas tar or these tars themselves. In many cases is is satisfactory to use fresh quantities of the same solvent in a later stage of purification for removing the remaining naphthalene and in such instances the preferred solvents are the heavy distillates of coal tar or water gas tar, specific examples of which are indicated by tests recited below.

|  | Heavy coke-oven tar oil | Heavy water gas tar oil |
|---|---|---|
| Specific gravity (33° C.) | 1.08 | 1.06 |
| Solids at 20° C. | None. | None. |
| Distillation: |  |  |
| To 235° C. | 2.0 | 3.6 |
| 270 | 20.4 | 7.5 |
| 300 | 43.8 | 20.5 |
| 315 | 55.0 | 34.7 |
| 355 | 85.0 | 74.9 |

When it is desired to use the same solvent in both the initial and final stages of purification, it is preferable to accomplish the entire purification in the same treating tower, the partially spent solvent from the final stage being allowed to drain into the initial stage where it replenishes and refreshes the solvent used in such initial stage.

It is often desirable to distill the spent oil to remove the naphthalene and any light oils or gum forming materials extracted from the gas. The spent oil in the recirculating system is withdrawn at a rate equal to the addition of fresh oil to the system plus the volume of absorbed materials. The withdrawn oil is distilled and used for further removal of naphthalene. In this system, the distilled and rejuvenated oil is again used as fresh oil, being supplied to the absorber in the final stage of purification. The only additional oil required, once the system is set in operation, is occasioned by mechanical losses and is practically negligible in amount.

In many cases it may be desirable to use different solvents in the initial and final stages of purification. The use of petroleum oils in the initial stage is objectionable because these do not completely dissolve tar, and tend to precipitate quantities of sludge which may cause stoppages in the scrubbing apparatus, and serious difficulties in operation. On the other hand, it is difficult to obtain tar derivatives such as coke oven tar oil or heavy water gas tar oil which are entirely free from naphthalene, and superior results are obtained when petroleum oils free from naphthalene are used in the final stage. For example, kerosene or gas oil may be used. Where different solvents are employed in the different stages, I prefer to use tar in the initial stage for the reason that it is effective for removing both tar and naphthalene. It is particularly advantageous by reason of the fact that the extracted tar increases the bulk of the solvent and thus it is only necessary to remove the excess, the addition of fresh solvent being unnecessary. It is of course, preferable to carry out the initial and final stages of purification in different absorbers where two solvents are used.

An advantage of the use of petroleum oil in the final stage lies in the fact that there is less absorption of ammonium phenolate and consequent loss of ammonia than when tar oils are employed.

In general, I prefer to extract the tar and naphthalene subsequent to the primary coolers but it is sometimes desirable to effect such removal after the exhausters and in this case I provide cooling means to compensate for the increased temperature of the gases caused by their passage through the exhausters. The gas itself may be cooled, in which case I prefer to use recirculated ammonia liquor in direct contact with the gases or I may cool the tar or other solvent out of contact with the gas.

I have found that it is important to reduce the naphthalene content of the gas in the initial stage or stages in order to secure the full benefit of the final naphthalene removal stage. The gas entering the final stage of purification should contain not more than about thirty grains of naphthalene per hundred cubic feet, this being based on an initial naphthalene content of sixty grains or more. In winter, or under certain special conditions, the initial naphthalene content is frequently much lower than sixty grains per hundred cubic feet and under such circumstances I prefer to reduce the naphthalene content to half the initial naphthalene content before passing to the final stage of purification by regulating the solvent supply.

In the accompanying drawings which illustrate more or less diagrammatically certain preferred embodiments of my invention:

Figure 1:
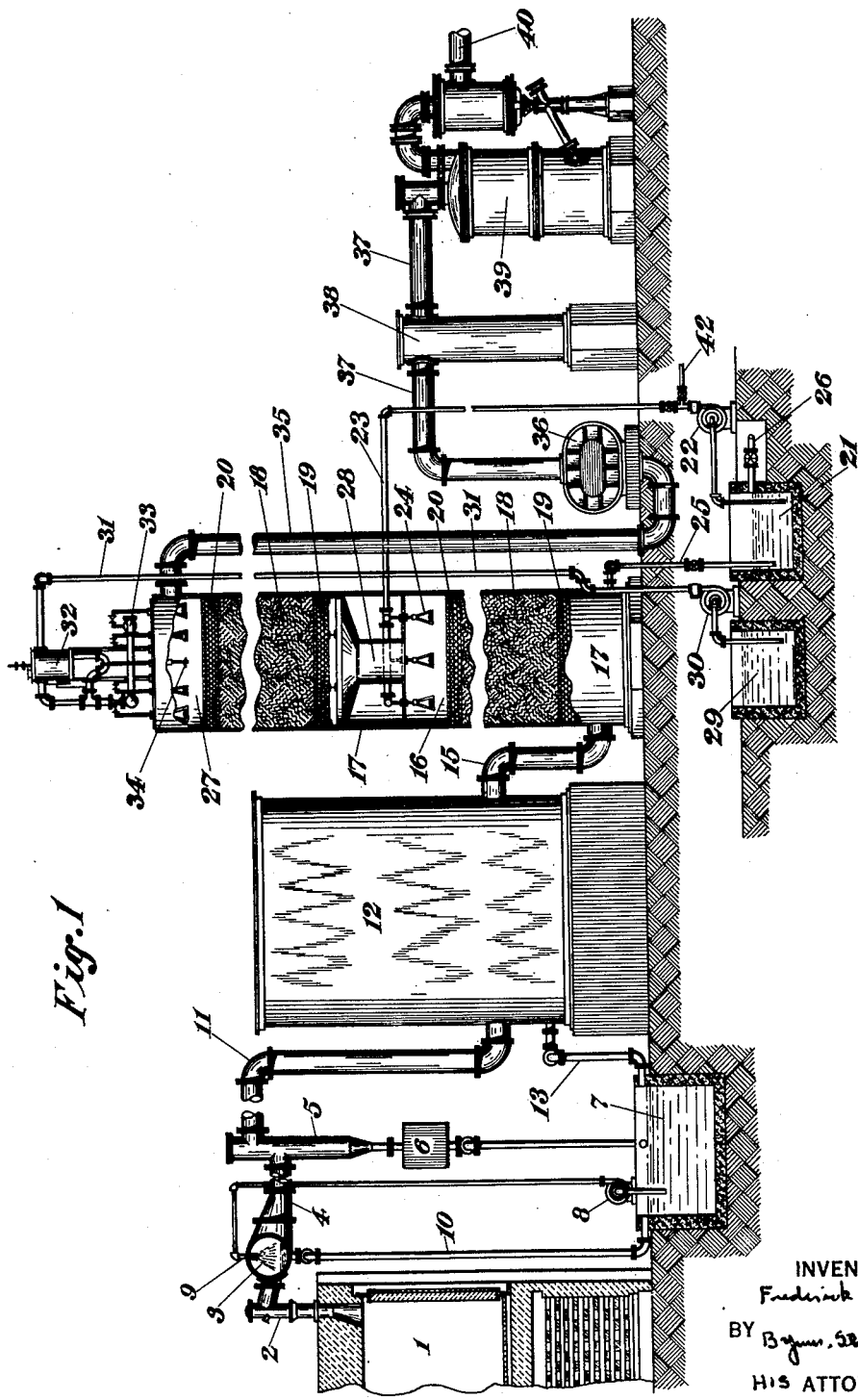
Fig. 1 is a side elevation, partly broken away, of an apparatus for the treatment of by-product coke oven gas including the removal of ammonia, naphthalene, and tar, the naphthalene and tar being removed between the ovens and the exhauster.

Referring first to Fig. 1 there is shown a by-product coke oven 1 forming a part of a battery of such ovens. Each oven is provided with an ascension pipe 2 whereby the gases may leave the oven and pass to a hydraulic collecting main 3. The gas in the collecting main 3 is partially cooled and condensed by the action of a plurality of sprays 9 which are supplied with weak ammonia liquor from a sump 7 by means of a pump 8. A return pipe 10 leads from the collecting main 3 back to the sump 7.

The gas leaves the collecting main 3 through a cross-over pipe 4 to a pitch trap 5 having at its bottom end a seal pot 6. The pitch and other material collected in the trap 5 drops into the sump or hot drain tank 7 and there meets the tar and ammoniacal liquor from the collecting main 3.

From the pitch trap 5 the gas passes through the suction main 11 into the so called primary cooler 12 where it is cooled by indirect contact with water. Any condensate forming in the cooler 12 drains to the tank 7 through a conduit 13. The gas travels through the primary cooler 12 and thence through a conduit 15 into the lower section 16 of an absorber 17. The section 16 contains one or more banks of turnings 18 which are made of aluminum or some other non-corrodible metal. The various banks of turnings are supported on layers of distributing means 19 which distributing means are preferably in the form of "diamond hurdles". These diamond hurdles consist of rows of square wooden staves lying on one corner, the several rows lying crosswise of one another. The diamond hurdles act as distributors for insuring uniform distribution of solvent over the entire cross section of the absorber and the top bank of turnings in the section 16 is provided with an upper layer 20 of these diamond hurdles to initially distribute the solvent which is supplied to the tower section.

The solvent which is used in the lower section of the absorber is drawn from a sump 21 by a circulating pump 22 and is supplied through a conduit 23 to spray nozzles 24. The sprayed solvent is distributed over the tower by the diamond hurdles 20 and passes down through the banks of turnings 18, being redistributed at intervals by the banks of diamond hurdles 19. The turnings hold the solvent in the path of the gas and insure intimate contact over a large area. When the solvent reaches the bottom of the tower it returns to the sump 21 through a conduit 25. A drain line 26 is provided for maintaining a uniform volume of recirculated solvent.

The lower section 16 of the tower is effective for removing substantially all the tar contained in the gas and also about half of the naphthalene present. The partially purified gas passes upwardly to the section 27 of the tower through an opening 28. The upper section of the tower is arranged substantially the same as the lower section, being provided with alternate banks of diamond hurdles 19 and aluminum turnings 18 and a top layer 20 of diamond hurdles for effecting an initial distribution of the solvent.

It is preferred to use substantially uncontaminated solvent for the final stage of purification and this is withdrawn from a sump 29 by a pump 30. The pump forces the solvent through a conduit 31 leading to a tank 32 on the top of the tower 17. The tank 32 is supplied with suitable siphoning mechanism forming no part of the present invention but effective for discharging measured quantities of the solvent at timed intervals to a manifold 33 connected to spray nozzles 35. As described in my Patent 1,578,687, it is highly desirable to supply the fresh solvent at timed intervals and at high flow rates in order to insure suitable distribution of the relatively small quantities of solvent which are being handled.

The solvent supplied at any one operation of the nozzles is distributed over the tower and passed down through the packing as a well defined film or menstruum. The tower packing in the upper section is preferably of such depth that two or more of these menstruums will always be present during normal operation. The final stage of treatment in the tower 17 is effective for removing substantially all of the remaining naphthalene. The purified gas leaves the top of the tower through a conduit 35 connected to the exhaust 36 from which it passes through a conduit 37 having a pre-heater 38 placed therein. The conduit 37 leads to an ammonia saturator 39 of the usual type where ammonia is removed in the form of ammonium sulphate. The gas, now free of tar, naphthalene and ammonia, passes through a conduit 40 to the final coolers, purifiers or distributing mains.

The use of a packing medium in the tower, such as aluminum turnings or other noncorrosive metal, makes it possible to place the treating tower 17 in the position shown herein. This positioning of the apparatus is accompanied by many advantages as heretofore set out.

If desired, a branch line 42 may be provided in the conduit 23 whereby the solvent used in the lower stage of the tower 17 may be taken off in desired amounts for distillation. The solvent in the lower stage is, of course, recirculated and used time and time again, its purity being maintained up to a desired standard by the addition of fresh solvent from the final stage of purification as such oil passes through the tower packing and descends downwardly through the duct 28.

Figure 2:
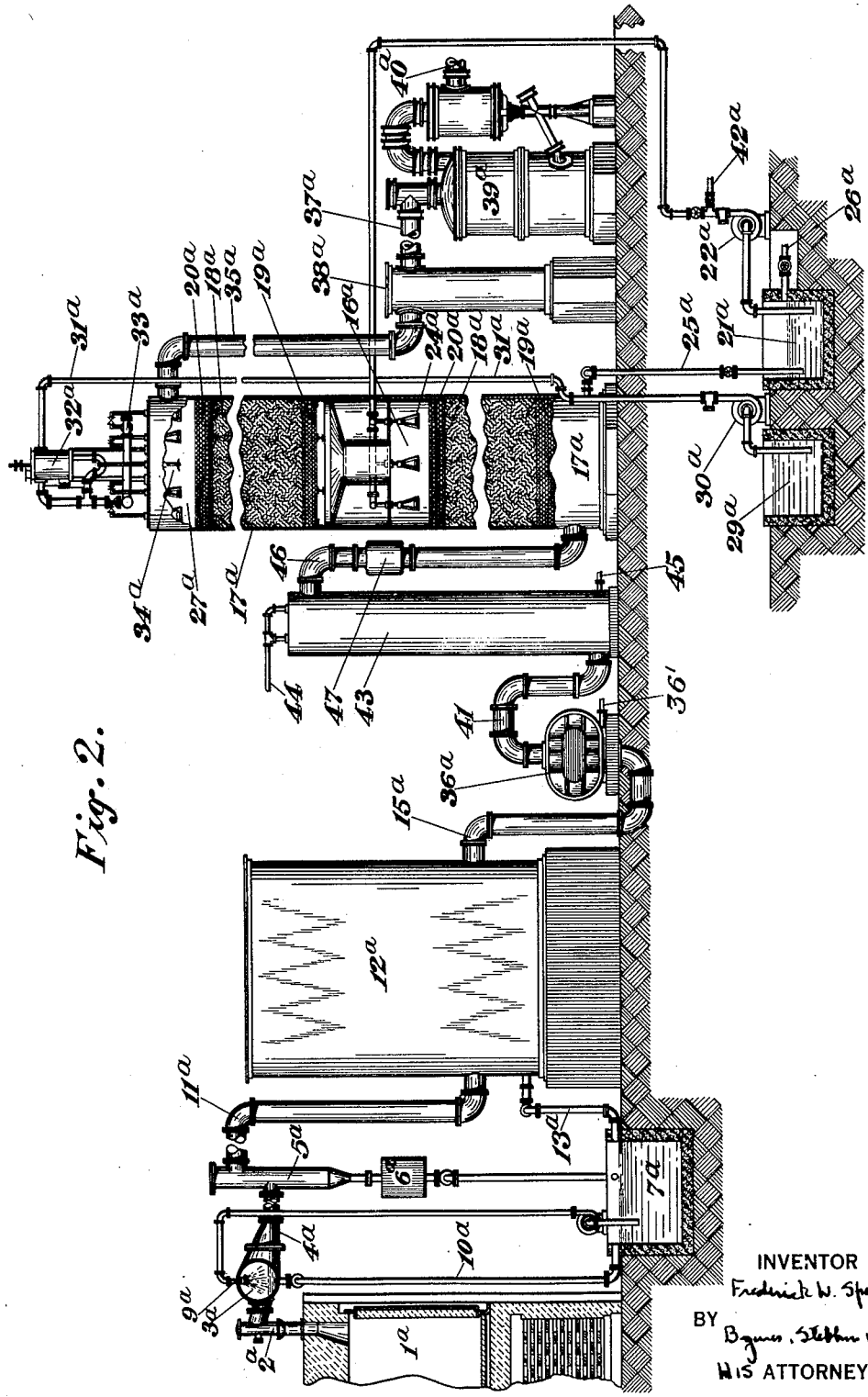
Fig. 2 is a view similar to Fig. 1 but showing a modified form of apparatus in which naphthalene and tar are removed subsequent to the passage of the gas through the exhauster.

Referring to the embodiment of the invention illustrated in Fig. 2, parts corresponding to similar parts in Fig. 1 have been given the same reference character with an $a$ suffixed thereto. In this embodiment of the invention, the exhauster 36a is placed ahead of the treating tower 17a. The gas leaves the exhauster 36a and travels through a conduit 41 to a cooler 43 where it comes into contact with cool weak ammonia liquor supplied through sprays connected to a conduit 44 and withdrawn through a drain 45. This is effective for dissipating the heat added to the gas by the exhauster 36a. The cooled gas passes from the cooler 43 to the treating tower 17a through a downcomer 46 having a separator 47 therein. A drain 36' is provided on the exhauster 36a to remove any tar which may separate from the gas.

In the two embodiments of the invention so far discussed, the same solvent is used in both the initial and final purification stages. In certain cases it may be desirable to use different solvents in the several stages.

Figure 3:
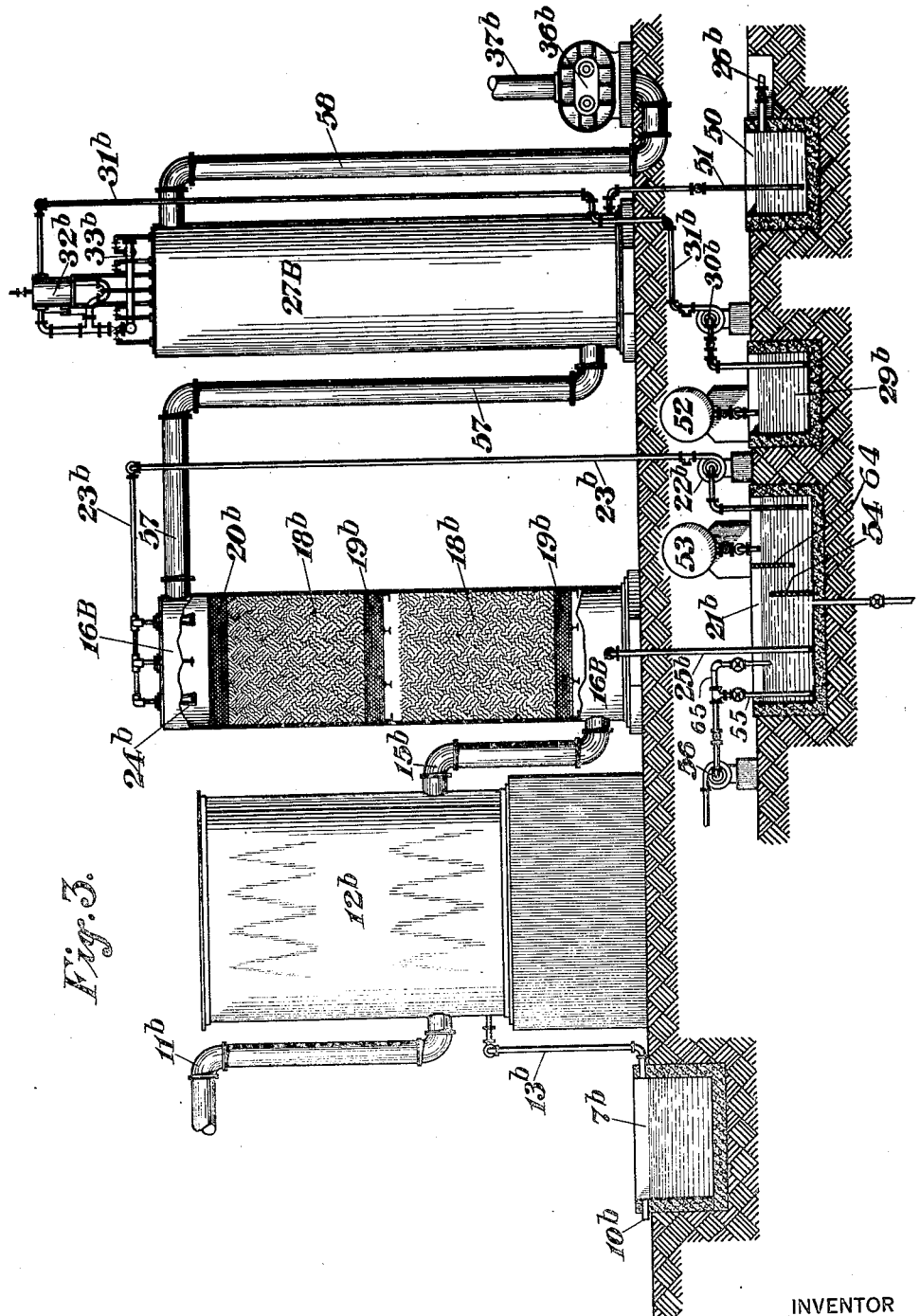
Fig. 3 is a side elevation, partly broken away, of an apparatus wherein the final stage of naphthalene removal is independent of the initial stage of naphthalene removal and the tar removal; and, Fig. 4 is a view similar to Fig. 3 but showing the tar and naphthalene removal apparatus placed beyond the exhauster.

Figure 3 shows one form of the invention where such an arrangement is provided. In this drawing, parts corresponding to similar parts in Figure 1 have been given the same reference characer with a letter $b$ suffixed thereto. In this form of the invention gas passes from the primary cooler 12b through a conduit 15b to a tower section 16B which is supplied with a packing of diamond hurdles and aluminum turnings as heretofore described in connection with the embodiment of Figures 1 and 2. The tower 16B is effective for an initial stage of purification, the final stage being accomplished in a second treating tower 27B. The sump 21b is filled with tar and is continuously recirculated through the tower 16B by the pump 22b.

A baffle 54 is provided in the sump 21b dividing the sump into two compartments. The pump 22b draws its supply of tar from one of these compartments and the discharge or return pipe 25b terminates in the other compartment. Any sediment or pitchy material in the tar which is returned to the sump through the pipe 25b separates by gravity while the tar itself overflows the baffle 54 to be recirculated by the pump 22b. The volume of the tar in the sump 21b is constantly increasing by reason of the tar removed from the gas and the excess may be taken off through a conduit 55 having a pump 56 therein.

A second baffle 64 is also provided for preventing any light liquids, such as ammonia liquor, from getting into that portion of the sump 21b from which the pump 22b is supplied. It will be noted that the conduit 55 extends to a point near the bottom of the sump, and further, that it is provided with a valve. A branch conduit 65, also having a valve, is provided and this branch conduit extends only a short distance below the normal level of the liquid in the sump. By properly setting the valves in the conduits 55 and 65, the pump 56 may be used for withdrawing tar or lighter liquids. The discharge conduit of the pump 56 is suitably connected to the tar tanks, or to a receiver for the lighter liquids, through suitable valved connections (not shown). A drain for the sump is also provided as indicated in the drawings.

If the viscosity of the tar increases to too high a point, it may be decreased by adding a lighter material such as water gas tar from a storage tank 53.

The tar free gas passes out of the absorber 16B containing approximately half of its original naphthalene content, and flows through a conduit 57 to the absorber 27B. The absorber 27B is provided with a packing material the same as the tower 16b and is also provided with means for supplying the solvent thereto from the sump 29b just like the upper section of the tower shown in Figure 1. Petroleum oil is preferably used as a solvent in this stage, fresh oil being supplied from the tank 52 as required. The spent oil flows to a sump 50 through a conduit 51 leading from the bottom of the tower 27b and is taken off as required by a drain 26b. The naphthalene free gas travels through the downcomer 58 to the exhauster 36b which compresses it and passes it along to the ammonia recovery system.

Figure 4:
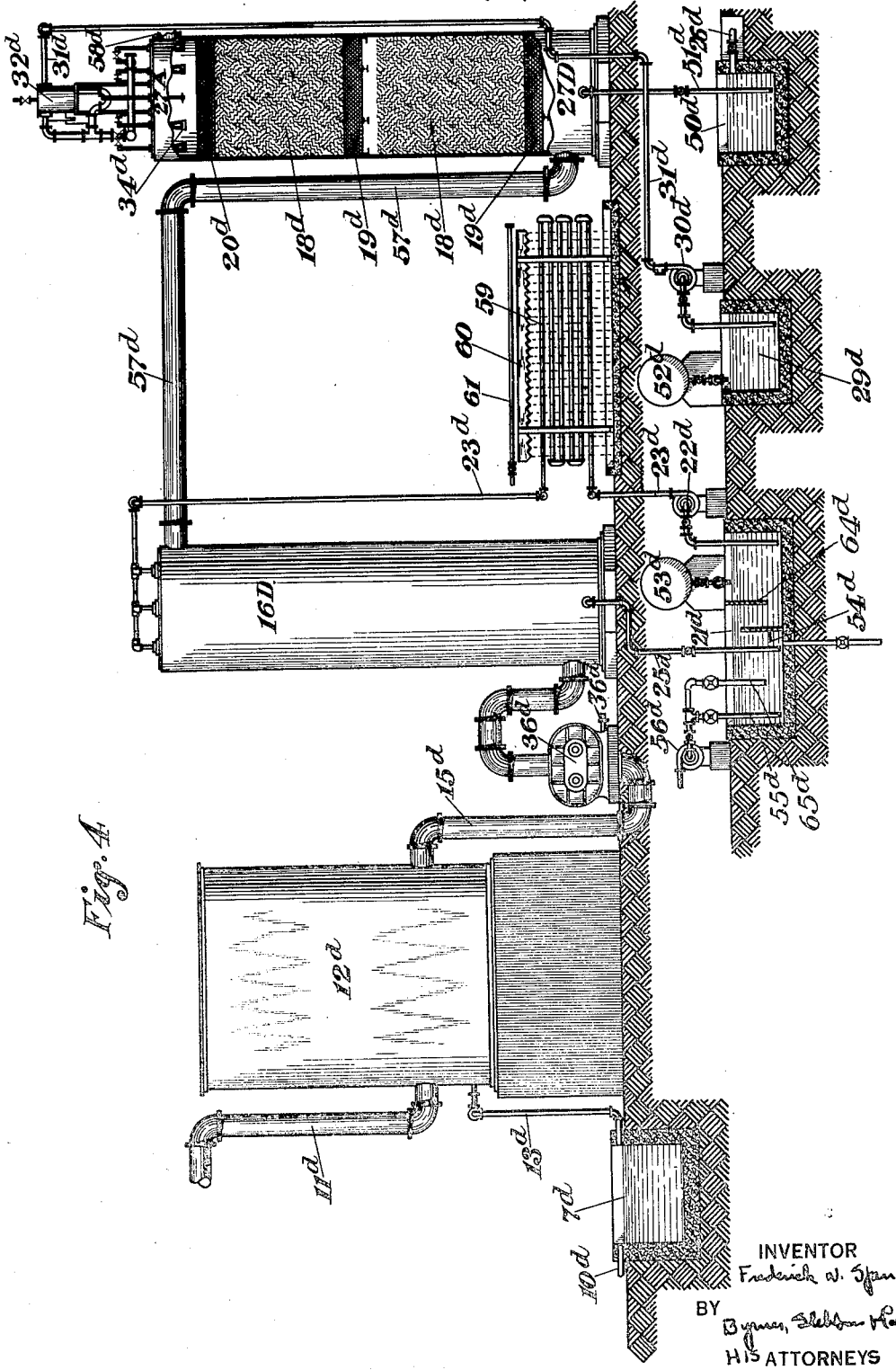

Figure 4 shows still another form of the invention in which parts corresponding to similar parts in Figure 1 have been given the same reference characters as Figure 1 with a letter $d$ suffixed thereto. Certain of the parts correspond to similar parts in Figure 3 in which case the subscript $d$ has been used instead of the subscript $b$. In this form of the invention, resort is had to cooling the solvent used in the tower 16D instead of cooling the gas. The means employed comprise a cooling coil 59 in the conduit 23d. A trough 60 supplied from a water pipe 61 is placed above the coil 59 and sprays of cold water trickle over the exterior of the coil as shown. This keeps the gas down to such temperature that the process may be carried out satisfactorily. Because the tar which is supplied to the tower 16D is cold, there is a strong tendency for ammonia liquors to condense out of the gases. These ammonia liquors are present in the contaminated solvent, and the baffle 64d is of particular importance in this form of the invention, although it may be advantageously used in other embodiments thereof.

I have illustrated and described certain preferred forms of the invention but it will be understood that it is not limited to such forms. It will be further understood that I have used the term "fuel gas" as a term of definition and not of limitation, and that it is intended to cover illuminating gas as well. When I refer to "tar" as a solvent I intend by the use of the word to include tar distillates. The invention may be embodied or practiced in apparatus other than that shown in the drawings, within the scope of the following claims.

I claim:—

1. In the process of treating fuel gas, the steps consisting of treating the gas with a solvent to effect the removal of naphthalene and tarry matter, collecting the contaminated solvent after such step, effecting a gravity separation from said solvent of at least a portion of the constituents removed from the gas and treating the gas with a separated portion.

2. In the process of treating fuel gas, the steps consisting of treating the gas with a solvent to effect the removal of naphthalene and tarry matter, collecting the contaminated solvent after such step, effecting a gravity separation therefrom of at least a portion of the constituents removed from said gas, treating the gas with a separated portion and refreshing the separated portion of the solvent.

3. In the process of treating fuel gas, the steps consisting in treating the gas with a solvent to effect the removal of naphthalene and tarry matter, collecting the contaminated solvent after such step, separating any ammonia liquors and a portion of the tarry matter taken from the gas from the solvent, and using the solvent for the further treatment of gas.

4. In the process of treating fuel gas, the steps consisting in preliminarily treating the gas with solvent to remove substantially all of the tar together with a portion of the naphthalene from the gas, said solvent being supplied in amounts sufficient to reduce the naphthalene content to less than 30 grains per hundred cubic feet, and then treating the gas with a different and substantially uncontaminated solvent to effect further and substantially complete naphthalene removal.

5. In the process of treating fuel gas, the steps consisting in scrubbing the gas with tar to effect removal of naphthalene and tar, and treating the gas with another and unrecirculated solvent immediately after the first mentioned treatment.

6. In the process of treating fuel gas, the steps consisting in preliminarily scrubbing the gas with a tarry liquid and treating it with unrecirculated petroleum oil immediately after the first mentioned treatment.

7. The process of treating fuel gas containing naphthalene and tar which comprises first treating the gas with a solvent derived from tar to remove from the gas substantially all of the tar together with a portion of the naphthalene, said solvent being supplied in amount sufficient to reduce the naphthalene content to less than 30 grains per hundred cubic feet of gas, and then treating the gas with a substantially uncontaminated petroleum derivative to effect substantially complete removal of the remaining naphthalene from the gas.

8. The process of treating fuel gas containing naphthalene and tar which comprises first treating the gas with a recirculated solvent derived from tar to remove from the gas substantially all of the tar together with a portion of the naphthalene, said solvent being supplied in amount sufficient to reduce the naphthalene content to less than 30 grains per hundred cubic feet of gas, and then treating the gas with a substantially uncontaminated and intermittently supplied petroleum derivative to effect substantially complete removal of the remaining naphthalene from the gas.

In testimony whereof I have hereunto set my hand.

FREDERICK W. SPERR, JR.